(12) United States Patent
Hayes, II et al.

(10) Patent No.: US 7,838,096 B2
(45) Date of Patent: Nov. 23, 2010

(54) REINFORCED SYNTHETIC INLAYS AND SEAMS

(75) Inventors: Graham E. Hayes, II, Upper Marlboro, MD (US); Braddock Boyd, Fredericksburg, VA (US)

(73) Assignee: DOC Sports Surface Contractors, LLC, Fort Washington, MD (US)

( * ) Notice: Subject to any disclaimer, the term of this patent is extended or adjusted under 35 U.S.C. 154(b) by 393 days.

(21) Appl. No.: 11/967,919

(22) Filed: Dec. 31, 2007

(65) Prior Publication Data

US 2009/0169797 A1    Jul. 2, 2009

(51) Int. Cl.
 *B32B 3/16* (2006.01)
 *E01C 13/08* (2006.01)
(52) U.S. Cl. .................. 428/62; 428/17; 156/304.4
(58) Field of Classification Search .............. 428/62, 428/61, 58, 57, 17; 156/304.4, 304.7
See application file for complete search history.

(56) References Cited

U.S. PATENT DOCUMENTS

| | | | |
|---|---|---|---|
| 2,552,114 A * | 5/1951 | Reinhard | ............ 428/62 |
| 3,969,564 A | 7/1976 | Carder | |
| 3,974,312 A | 8/1976 | Stevens et al. | |
| 4,039,078 A | 8/1977 | Bone | |
| 4,152,473 A | 5/1979 | Layman | |
| 4,489,115 A | 12/1984 | Layman et al. | |
| 4,581,269 A | 4/1986 | Tilman | |
| 4,755,401 A | 7/1988 | Friedrich et al. | |
| 5,254,407 A | 10/1993 | Sergerie et al. | |
| 5,615,816 A | 4/1997 | Deschenes et al. | |
| 5,693,171 A | 12/1997 | Foster et al. | |
| 5,761,765 A | 6/1998 | Fuzzell | |
| 5,976,290 A | 11/1999 | MacDonald et al. | |
| 6,971,515 B2 | 12/2005 | Cooper et al. | |
| 7,249,913 B2 | 7/2007 | Linville | |
| 2004/0234719 A1 | 11/2004 | Jones | |

FOREIGN PATENT DOCUMENTS

| | | |
|---|---|---|
| JP | 07-082704 A | 3/1995 |
| KR | 20-0432210 Y1 | 11/2006 |
| KR | 10-0788942 B1 | 12/2007 |

OTHER PUBLICATIONS

International Search Report and Written Opinion for PCT/US2008/088266 dated Mar. 11, 2009.

* cited by examiner

*Primary Examiner*—Alexander Thomas
(74) *Attorney, Agent, or Firm*—Sughrue Mion, PLLC

(57) ABSTRACT

A reinforced seam/inlay and method for forming such seam/inlay to join pieces of synthetic turf material together are disclosed. The reinforced seam/inlay structure comprises abutted edges of first and second synthetic turf pieces having a backing joined together; a seaming cloth/tape material coated with an adhesive/glue, volatile solvent or heat activated material applied is positioned beneath the abutted edges of synthetic turf pieces wherein said abutted edges are adhered to said seaming cloth/tape material; and reinforcement fastener elements inserted through both the backing of the synthetic turf material, through the adhesive and the seaming cloth/tape material; or seam/inlay structure comprises of overlapping edges of first and second synthetic turf pieces having a backing joined together; the backing without seaming cloth/tape material can be coated with an adhesive/glue, volatile solvent or heat activated material or not and reinforcement fastener elements inserted through both the backing of the synthetic turf material.

8 Claims, 5 Drawing Sheets

REINFORCED SYNTHETIC INLAYS AND SEAMS

BACKGROUND OF THE INVENTION

This invention relates to methods for installation and repair of synthetic turf fields and areas. In another aspect, this invention relates to improved seams and/or inlays and methods for forming the same whereby a fastener element is employed to create a reinforced seam and/or inlay. In yet another aspect, this invention relates to a reinforced seam and/or inlay and method for forming the same, which is exceptionally strong, wear-resistant in indoor and outdoor installations, safe and cost efficient.

In recent years, synthetic turf materials have been widely used to cover athletic fields, parade grounds, playgrounds, highway medians, airport safety areas, runways and taxiways, areas surrounding swimming pools, patios, and the like. Such synthetic turf materials normally simulate a well manicured, natural grass surface in that the synthetic turf material is made up of a multitude of upstanding ribbon-like fibers that are secured to a base or a substrate. Such durable surfaces are now widely used for the surfaces of athletic playing fields and the like, wherein the synthetic turf is exposed to grinding, abrasive, and twisting forces, caused by the shoes of athletes, animals, and the like, as they walk or run across the surface of the synthetic turf.

The installation of synthetic turf material is some way resembles the installation of carpet material in that the synthetic turf material is unrolled, cut to the desired sizes, and the adjacent pieces of synthetic turf material are brought together by some manner and means.

Many different techniques have been utilized for the installation of synthetic turf materials.

One technique that has been utilized for the installation and repair of synthetic turf materials for seam or inlays utilizes a heat sealing technique and an adhesive, volatile solvent or heat activated adhesive material to seam. This is done by placing a piece of turf to be joined or attached on top of a shaven/trimmed area or turf. The adhesive, volatile solvent or heat activated adhesive material is applied to the shaven area and the piece to be attached is placed on top of the adhesive, volatile, solvent or heat activated adhesive material. Thereafter, by the application of pressure to compress the lower portion of the abutted edges into the adhesive material on the surface of the tape material, some fusion or adhesion will take place to thereby form a bond between the abutted edges of the synthetic turf material and the surface of the tape material. Once the adhesive, volatile solvent or heat activated materials are cured and dried, it improves the structural properties of joined/seamed or attached pieces of synthetic turf.

Particularly if the synthetic turf is to be laid on a playing field for a certain type of sport, for example, on a tennis court, a football field or the like, lasting playing field marking lines are required in the turf material. It is not uncommon to use separately manufactured material strips, which are usually inserted into a gap of corresponding width cut into the turf material after it has been laid for the playing field marking lines. By application of various types of glue, material and adhesive material, wherein some type of a reinforcement cloth type material/tape is positioned beneath the abutted edges of the synthetic turf material to be seamed, the joining strip is coated with an adhesive and serves to bond the underside of the turf material with the underside of the material strip acting as playing field marking lines. Use of such a joining strip in the form of an adhesive strip can be problematic as correction of the material parts to be aligned with one another is extremely difficult once an adhesive connection has been established. Also, handling of the adhesive strip is bothersome due to the adhesive spontaneously adhering to everything with which it comes into contact, resulting in the hands and appliances of the workmen laying the ground covering being soiled after only a short time by the adhesive residues which, to say the least, severely impedes precise workmanship.

Another problem with this process is that it is often necessary to place a weight of some sort on the seamed/joined areas to keep the glue/adhesive, volatile solvent or heat activated adhesive material in direct contact with both the turf backing and cloth type material/tape or shaven area on top of a piece of turf. Another process for maintaining contact between the adhesive material and the turf backing and the seaming/cloth tape material involves the use of various type of rollers where the roller is moved across the seamed/joined area applying pressure to the top piece of synthetic turf and to press it downward into the adhesive, volatile solvent or heat activated material on top of cloth type material/tape or shaven area of another piece of turf. Pressure is constantly or repeatedly applied until the adhesive, volatile solvent or heat activated material starts to cure, firm up and or dry to the stage of getting very tacky, sticky, and gooey to the degree that it can hold the two adjacent surfaces together itself. When using a weight it usually needs to remain in place for 8-24 hours and the workmen usually leave and return the following day to remove the weight. This is another cost associated with the current industry process.

Repeating this process for all of the hash marks, non-tufted lines, numbers, logos, and letters on synthetic sports fields is a major part of the installation process and contributes significantly to the cost of installation. Those projects where this process is rushed and not done properly create a majority of the repair work needed down the road once the field is played on due to the pressure and stress of athletes and kids playing on the surface supported only by the contact between the adhesive, volatile solvent or heat activated material and cloth type material/tape that was used during the installation process. A significant problem with creating strong seams and inlays is the inconsistent surface of tufts that extend out through the backing of the turf. Historically the industry has not been able to develop a coating that would adhere to the tufts without flaking off. The tufts act like stilts preventing the backing from lying uniformly down in the adhesive and those tufts are often the source of most of strength of the seam. The constant process of rolling and weighting the seams and inlays is to drive the backing of the turf down into the adhesive to create additional contact points exceeding the tufts.

Other techniques have been proposed wherein an attachment means is additionally employed for seams and inlays in both the synthetic turf industry and carpet installation industry such as hook and loop fastener elements (U.S. Pat. No. 4,755,401 rib and groove fastener profile (U.S. Pat. No. 4,581,269) tacks (U.S. Pat. No. 5,693,171) and staples. However these attachment means are inadequate and often unsafe for synthetic turf playing fields.

It is, therefore, apparent that there is a need for improved seams and inlays and a method for forming the seams between the abutted edges of synthetic turf material and for forming inlays. It is also apparent that there is a need for improved seams and inlays and method for installing seams and inlays that is quick and can be easily done under field conditions and can maintain its strength over long periods of use and exposure to the elements.

SUMMARY OF THE INVENTION

It is an object of the present invention to provide improved/reinforced seams and/or inlays.

It is another object of the present invention to provide improved/reinforced seams and inlays and a method of installing or repairing synthetic turf materials using the same.

It is another object of the present invention to provide improved/reinforced seams and inlays and a method of installing or repairing synthetic turf materials using the same, which is exceptionally strong, wear-resistant in outdoor installations, safe and cost efficient.

According to one aspect of the invention, a fastener element is employed during installation of synthetic turf materials to create a reinforced seam.

According to another aspect of the invention, a fastener element is employed during repair of synthetic turf materials to create a reinforced inlay.

A synthetic grass surface comprising spaced rows of ribbons for installation on a supporting substrate includes pile fabric with a flexible sheet backing and rows of upstanding synthetic ribbons representing blades of grass, extending upward from the backing. The backing is the foundation and structure of the synthetic turf system, and must be put together with another piece of synthetic turf to create a single/solidly joined piece of synthetic turf lying across the surface. A seam and/or inlay and method for forming such seam and/or inlay to join pieces of synthetic turf material together are disclosed.

In the present invention seamed or joined pieces of synthetic turf are constructed/installed with seaming/cloth tape type material/tape with adhesive/glue applied and are used to form seams between abutted edges of synthetic turf material pieces. Once these pieces are seamed or joined, reinforcement fastener elements are installed to better secure the turf, adhesive/glue and cloth type material/tape together, the calibrated spacing of the fasteners creates the desired spacing between the turf backing and seaming material/tape providing maximum contact between both surfaces and the glue/adhesive, volatile solvent or heat activated adhesive material between the two surfaces. The seam/inlay reinforcement fastener elements are installed by inserting them down through the top of the backing of the turf through the backside of the turf backing and through the glue/adhesive, volatile solvent or heat activated adhesive and material reinforcement cloth type material/tape or shaved/trimmed area on another piece of turf. The reinforcement fastener element will prevent corners and edges from pulling out of the adhesive, volatile solvent or heat activated material, to improve the adhesion between the two adjacent surfaces to improve the strength of the seamed or joined area.

The reinforced seams and inlays and methods of installing them of the present invention will reduce the installation costs associated with purchasing bricks, wood, sand bags etc., applying them and then returning to remove them; and of the constant rolling of the field with a roller device to accomplish the same. The reinforced seams and inlays and methods of installing them of the present invention will reduce the overall cost of warranty work, reducing the number of repairs on the areas in which the reinforcement fasteners are installed. The reinforced seams and inlays and method of installing them of the present invention will also help support the seamed/joined areas in the event the adhesive, volatile solvent or heat activated material should start to breakdown for some reason, reducing the chance for a tripping hazard and/or the snagging of an open piece of turf on a piece of maintenance equipment and causing major damage to the field itself.

Other aspects, objects and advantages of the present invention will be apparent to those skilled in the art from the following description and appended claims or may be learned by practice of the invention by those of ordinary skill in the art. In the description, reference is made to the accompanying drawings which form a part thereof and in which is shown by way of illustration of specific embodiments for practicing the invention. These embodiments will be described in sufficient detail to enable those skilled in the art to practice the invention and it is to be understood that other embodiments may be utilized and that structural changes may be made without departing from the scope of the invention. The following detailed description is therefore, not to be taken in a limiting sense, and the scope of the present invention is best defined by the appended claims.

DETAILED DESCRIPTION OF THE INVENTION

Figure 1:
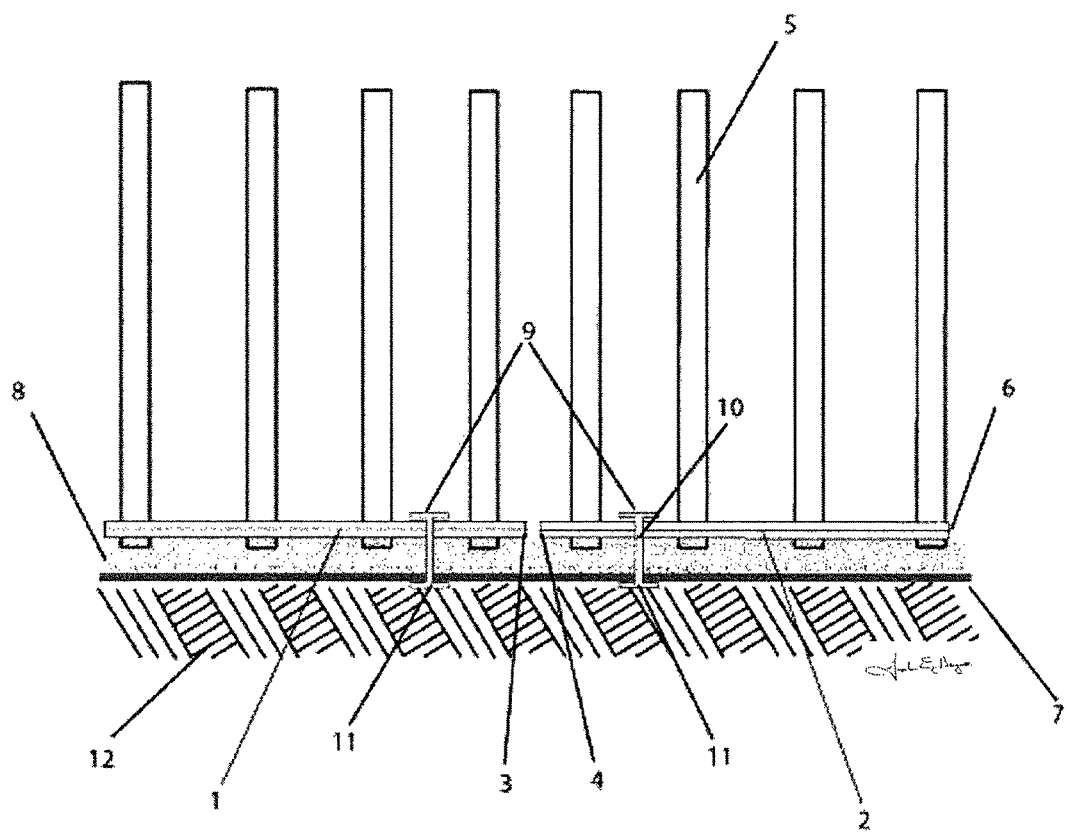
FIG. 1 is a view of the installation of two pieces of synthetic turf forming the seam in present invention.

The preferred embodiments of this invention can best be described by referring to the drawings. FIG. 1 is a perspective view of the installation of two pieces of synthetic turf material to form the seam of this invention. In FIG. 1, turf section 1 and turf section 2 are positioned such that edge 3 of turf section 1 and edge 4 of turf section 2 are placed close to each other. Normally, in the installation of a large area, such as an athletic field, edge 3 and edge 4 will be the straight side edges of the turf sections and will fit in close relationship along the entire length of each of turf sections 1 and 2. Turf sections 1 and 2 have a multitude of ribbons or filaments 5 extending upwardly from the surface thereof. This multitude of upstanding filaments or ribbons can be sheared or cut to a desired length to give the top surface of the turf section a grasslike appearance. As is well known in the art, the filaments or ribbons can be colored to any desired color to give the appearance of natural grass or for logos, decoration, numbers, etc.

Disposed along the underside of turf sections 1 and 2 is a polymeric backing material 6. Polymeric backing 6 can be any known polymer that is utilized in the manufacture of synthetic turf material. Normally, synthetic turf materials, especially those to be installed outdoors, have a polymeric backing or coating that forms an integral part of the synthetic turf material to lend dimensional stability to the turf material and to assist in holding the individual upstanding filaments or ribbons 5 in place. In one particularly preferred embodiment of this invention, the synthetic turf sections 1 and 2 are of the type of materials known as "tufted" materials, wherein lengths of filaments or ribbons 5 are punched into or inserted into apertures in a base material such as a woven polymeric sheet or scrim of material and thereafter, a suitable polymeric coating is applied to the back of the sheet to hold the individual ribbons or filaments in place. In such a well known manufacturing process, filaments or ribbons 5 can be inserted into a base and thereafter, a polymetric material such as molten polyvinyl chloride or a solution of polyvinyl chloride in a volatile solvent can be poured across or contacted with the back side of the tufted sheet to thereby allow the molten or dissolved polyvinyl chloride to penetrate and permeate the individual tufted ribbons or filaments. Thus, the molten or dissolved polymeric material will flow into the structure to thereby coat and surround the base of each of the tufted filaments or ribbons. When the polymeric material is allowed to solidify or when the solvent is allowed to evaporate, the individual ribbons or filaments 5 will be securely anchored to and affixed to the base to thereby form a very durable carpet-like structure with the upstanding filaments or ribbons held securely in place. As illustrated in FIG. 1 polymeric backing 6 securely holds and anchors the individual ribbons and filaments in place.

In the instant invention, as mentioned above, edges 3 and 4 of synthetic turf sections 1 and 2 are abutted together and reinforced seaming cloth tape material 7 is positioned beneath the abutted edges. Reinforced seaming tape 7 comprises a cloth like material which is relatively flexible and has high strength. Since reinforcing seaming tape 7 will form an integral part of the seam of this invention, it is, of course, desirable to utilize a reinforced seaming material that has sufficiently high strength to produce a seam having good dimensional stability and durability where it will not separate or pull apart under normal use. Preferably, flexible reinforcing tape 7 will be a tape material having reinforcing fabric such as woven or non-woven fiberglass, nylon filaments, polypropylene filaments, polyester filaments, and the like, running there through. An adhesive/glue coating 8 will be applied to one side of the reinforced seaming tape that is adjacent the abutted edges 3 and 4 to be joined.

When edges 3 and 4 are abutted together, seaming cloth/tape material 7 is positioned beneath the edge and the abutted edges 3 and 4 are then opened and a glue adhesive 8 is then applied to the seaming/cloth tape material 7 and the turf edges 3 and 4 are returned to the abutted position. In one embodiment, reinforcement fastener elements 9 comprising a thin rod-like flexible filament 10 and a cross bar 11 at each end wherein the filament connects the two ends are inserted through the backing of the turf and through the seaming cloth/tape material or turf backing pieces shaved/trimmed or without synthetic ribbons to better hold the pieces together. The reinforcing fastener elements 9 are inserted such that the filament portion connecting the cross bars 11 at each end of the reinforcing fastener element 9 vertically passes through the polymeric turf backing material 6, the adhesive material 8 and the seaming cloth/tape material 7 wherein the cross bar 11 at the top end of the filament 10 is on the topside of the turf section 1 and 2 and the cross bar 9 at the bottom end is at the underside of the seaming cloth/tape material 7.

Any means for inserting the fasteners may be used. In U.S. Pat. No. 4,039,078 to A. R. Bone, which is incorporated herein by reference, there are disclosed several different type of plastic fasteners, or attachments, which are suitable for use in inserting of fasteners. In U.S. Pat. No. 5,615,816 which is incorporated herein by reference, there is disclosed an apparatus for dispensing attachments from continuously connected ladder stock of the type comprising a pair of plastic sides members coupled together by a plurality of plastic cross links. The apparatus includes a mount, a support movable mounted on the mount, a carrier block mounted on the support. A needle block is mounted on each carrier block and a hollow, slotted needle is mounted on each needle block. A feed mechanism including a feed wheel is mounted on the support for advancing the ladder stock into the hollow slotted needle and a pair of feed tracks, one for each hollow slotted needle, are provided through which the ladder stock passes from the feed wheel into the hollow slotted needle. A pair of knives are provided for severing an attachment from the ladder stock, and a pair of ejector rods are provided for ejecting the severed attachment through the hollow slotted needles.

The fasteners range in length from ⅛ up to 2.5 inches and the lengths represent the distance of thin rod-like flexible filament 10 located between the cross bars 11, maintaining the fastened items the turf backing 6, through the adhesive material 8 and seaming material/tape 7 within this ⅛ to 2.5 range.

The fasteners may have various shapes, such as a U-shaped, V-shaped, but are not limited.

The fasteners range in tensile strength from 2 lb. to 25 lb. and the tensile strength represents the estimated range of the ability of the thin rod-like flexible filament 10 and cross bar 11 to sustain tension prior to breaking down.

Once the abutted edges are in place with the seaming cloth/tape material section 7 positioned beneath the edges 3 and 4, an adhesive/glue 8 is applied to the area to be bonded together and the reinforcing fastener elements 9 are installed. Any suitable adhesive may be utilized in the instant invention to complete bonding of the edges of synthetic turf sections 1 and 2 to seaming cloth/tape material 7.

The adhesive, volatile solvent or heat activated material 8 can be applied to the surface of seaming cloth/tape material 7 adjacent the lower portions of abutted edges 3 and 4. Once the adhesive, volatile solvent or heat activated material 8 is applied to the seaming cloth/tape material 7 or shaven/trimmed area of turf, it is allowed to stay open and breathe to allow solvents to evaporate and change from a flowing substance to a very tacky, sticky gooey substance to better hold the pieces or edges of synthetic turf and/or seaming cloth/tape material 7 once joined/seamed. Of course, it will be appreciated that the adhesive, solvent or heat activated material 8 can also be applied to the underside portions of edges 3 and 4. When the adhesive, volatile solvent or heat activated material has been applied to wet the surface of seaming cloth/tape material 7 as well as the bottom portions of edges 3 and 4, the edges 3 and 4 are forced downwardly in contact with the wetted surface of reinforcing tape 7. A force can be applied along at least a portion of the edges of the synthetic turf material to thereby urge the abutted edges into contact with the adhesive, volatile solvent or heat activated material coated surface of seaming cloth/tape material 7, to force air and the like from the locale of the seam and the solvent will soften.

Figure 2:
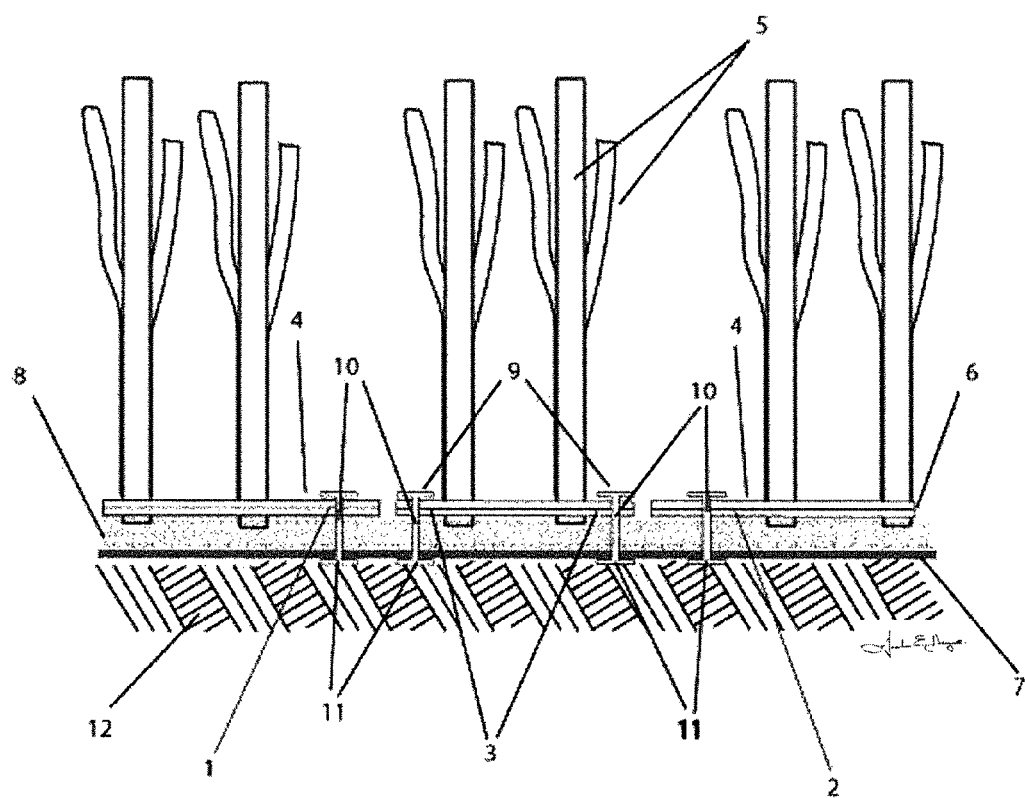
FIG. 2 is a view of the installation of a piece of synthetic turf on a shaven area of another piece of turf forming an inlay in the present invention.

The completed seam is illustrated in FIG. 2, wherein the elements of FIG. 1 that are the same, are depicted by the same numerical designation. In FIG. 2, it will be noted that synthetic turf sections 1 and 2 are made up of a multitude of individual ribbons or filaments 5 which are securely anchored into polymeric backing layer 6. Edges 3 and 4 have been abutted together to form a very close seam with seaming cloth/tape material 7 disposed thereunder. Reinforcing fastener elements 9 have been inserted through both the polymeric turf backing material and the seaming cloth/tape material.

Figure 3:
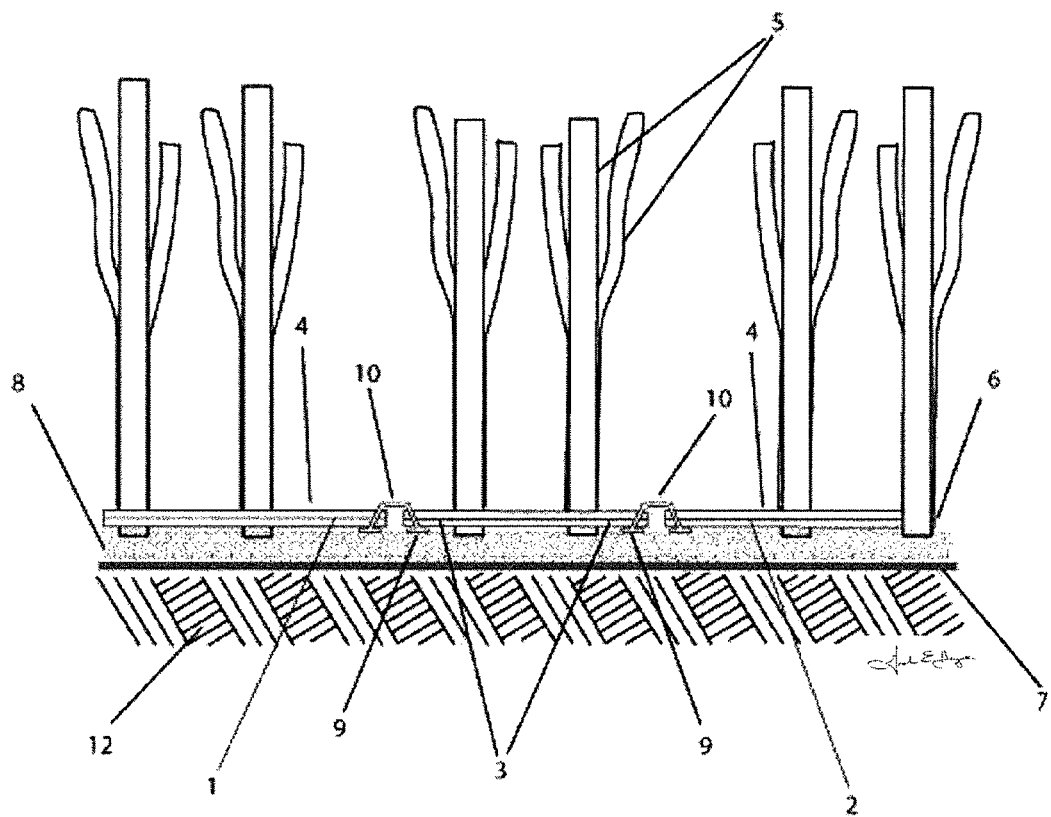
FIG. 3 is a view of three pieces of synthetic turf forming an inlay in the present invention with dual end fastening devices.

FIG. 3 shows another embodiment of the present invention in which the fastener element has a different shape wherein both ends of the fastener element are inserted through the synthetic turf material.

Figure 4:
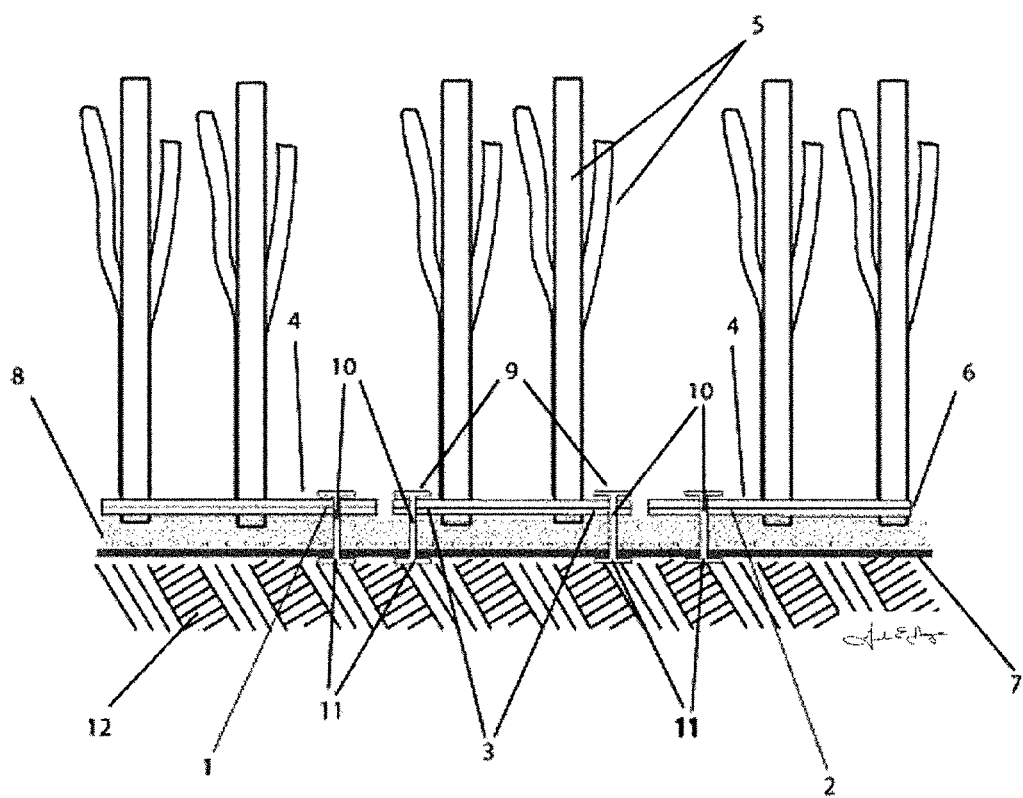
FIG. 4 is a view of three pieces of synthetic turf forming an inlay in the present invention with individual fastening devices.

FIG. 4 shows another embodiment of the present invention wherein three pieces of synthetic turf form an inlay with individual fastening elements.

Figure 5:
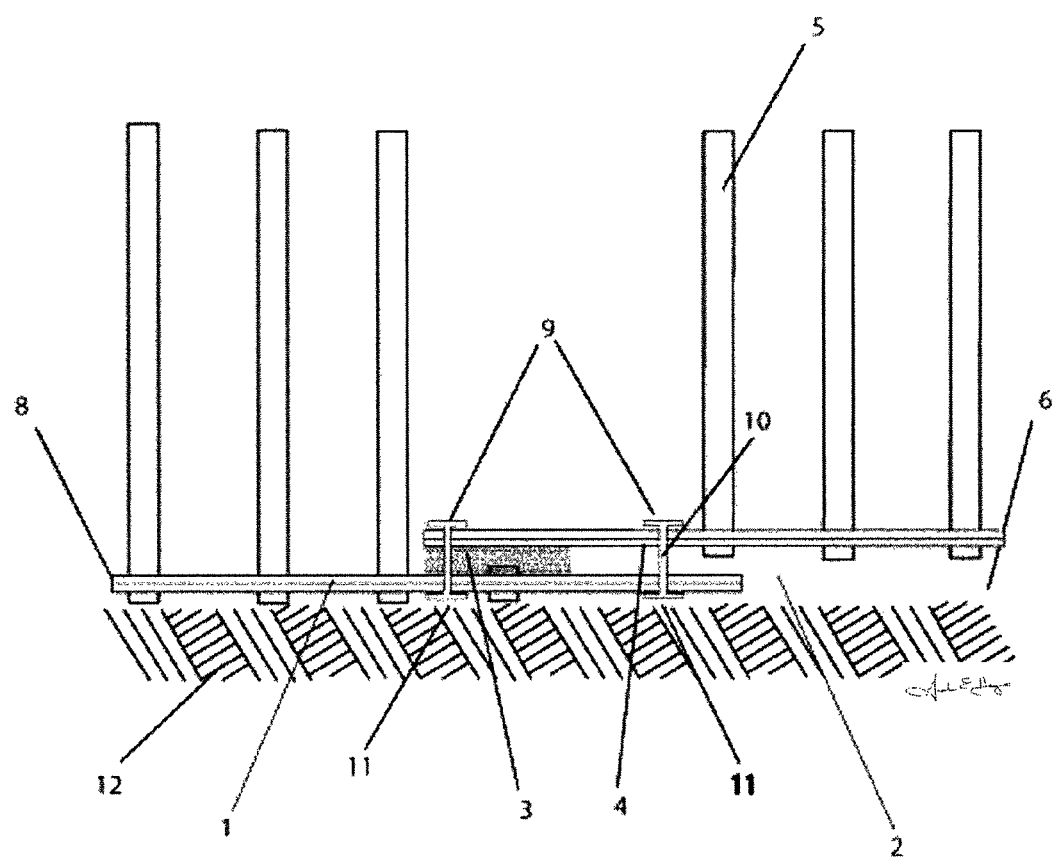
FIG. 5 is a view of two pieces of synthetic turf forming a seam in the present invention.

FIG. 5 shows an embodiment of the present invention wherein two pieces of synthetic turf form a seam.

In the instant invention, the synthetic turf materials can be installed over any suitable substrate 12 natural or manufactured and the like.

In the preferred embodiments of this invention, the polymeric backing of the synthetic turf material will be a backing that will resist the elements, in outdoor installation, as well as a backing that has good strength properties and dimensional stability. Also, in the preferred embodiments of this invention, the seaming cloth/tape material 7 can be a tape material that is coated, having substantially the same physical properties as the polymeric coating along the backside of the synthetic turf material to be joined.

The adhesive, volatile solvent or heat activated material 8 that can be utilized in the installation and or repair of the instantly described seams can be an industry approved adhesive, volatile solvent or heat activated material 8 and the surface of the seaming cloth/tape material 7.

It has been found particularly preferred that, in the laying of large areas of synthetic turf material that the synthetic turf sections can be cut and placed into proper edge abutting 3 and 4 relationship first and then the seaming cloth/tape material 7 can be properly positioned by folding back portions of the edge of the material. Thereafter, the reinforcing fastener elements 9 are successively inserted through the backing of the synthetic turf material 1 and 2, through the adhesive/glue 8 and through the seaming/cloth tape material 7. Any convenient method for applying the adhesive/glue 8 system, such as by painting, spraying, or troweling onto the surfaces, can be utilized. One method for applying the adhesive/glue is to utilize a pressurized solvent application head that can fit between the abutted edges 3 and 4 by slightly folding back the edges and dispensing the adhesive/glue 8 through a solvent dispensing head that can be pulled along the upper surface of the reinforcing tape 7. Thus, the adhesive/glue can be dispensed under pressure in a controlled and regulated manner to dispense just the correct amount of adhesive/glue necessary to form the seam. As the solvent dispensing head is drawn along the seam to be formed, a suitable roller can be rolled along the upper surface of the synthetic turf material to apply force to further urge the abutted edges into contact with the adhesive/glue 8, on the reinforcing tape 7.

In the laying of large areas of synthetic turf material 1 and 2, that the synthetic turf material can be cut and overlapped to create a seam. The reinforcing fastener elements 9 are successively inserted through the backing of the synthetic turf material 1 and 2. This process with or without adhesive is another way of creating a seam with the fastener.

Various changes and modifications may be made in the foregoing description and disclosure without departing from the spirit and scope of this invention up to and including the over lapping of edges 3 and 4 with not reinforced seaming tape and using the turf backing edges to attach together.

What is claimed is:

1. A reinforced seam structure comprising:
    abutted together edges of a first synthetic turf piece and a second synthetic turf piece joined together, each piece having a backing wherein said backing has a topside and an underside;
    a seaming cloth/tape material having a topside and an underside positioned beneath the abutted edges of said first and second synthetic turf pieces wherein said abutted edges are pressed down into an adhesive applied to the seaming cloth/tape material; and
    reinforcement fastener elements inserted through the backings of said first and second synthetic turf pieces, through the adhesive and the seaming/cloth tape material,
    wherein the reinforcement fastener elements comprise a vertical rod-shaped flexible filament portion connecting horizontal cross bars at the top end and bottom end thereof.

2. The reinforced seam structure of claim 1, wherein the reinforcement fastener elements range in length from 1/8 up to 2.5 inches, wherein the lengths represent the distance of the rod shaped flexible filament portion located between the cross bars, maintaining the fastened items the backing and seaming material/tape within a range of 3/64 inches to 2 and 7/16 inches.

3. The reinforced seam structure of claim 1, wherein the reinforcement fastener elements are inserted through both the turf backing, the adhesive and the seaming/cloth tape material such that the rod shaped portion vertically passes through both the turf backing material and the seaming/cloth tape material and the horizontal cross bar at the top end of the filament is on the topside of the turf backing material and the horizontal cross bar at the bottom end is at the underside of the seaming/cloth tape material 4. The reinforced seam structure of claim 1, wherein the reinforcement fastener elements have a tensile strength of from 2 lbs to 25 lbs.

5. A method for forming a reinforced seam structure according to claim 1, said method comprising:
    a) abutting the edges of synthetic turf pieces to be joined together, each piece having a backing wherein said backing has a topside and an underside;
    b) positioning a seaming/cloth tape material beneath the abutted edges of said synthetic turf pieces;
    c) applying an adhesive material for said backing on said seaming/cloth tape material beneath the abutted edges of said synthetic turf pieces;
    d) calibrating spacing between the backing of the artificial turf pieces providing maximum contact between both backings of the synthetic turf pieces;
    e) inserting at least one reinforcement fastener element through both the backings of the synthetic turf pieces the adhesive material and the seaming cloth tape material;
    f) allowing the adhesive material to cure and set up while said abutted edges are in contact with said seaming cloth tape material,
    wherein the at least one reinforcement fastener element comprises a vertical rod-shaped flexible filament portion connecting horizontal cross bars at the top end and bottom end thereof.

6. The method of claim 5, wherein the at least one reinforcement fastener element is inserted through the backing of the synthetic turf pieces, adhesive and the seaming cloth tape material such that the rod-shaped flexible filament portion vertically passes through the backings of the synthetic turf pieces, the adhesive material and the seaming/cloth tape material and the horizontal cross bar at the top end of the filament is on the topside of the backing of synthetic turf pieces and the horizontal cross bar at the bottom end of the filament is at the underside of the seaming/cloth tape material.

7. The method of claim 5, further comprising applying a force along at least a portion of the abutted edges of the synthetic turf pieces to thereby urge said abutted edges into contact with the adhesive on the seaming/cloth tape material.

8. The method of claim 5, wherein the at least one reinforcement fastener element has a tensile strength of from 2 lbs to 25 lbs.

* * * * *